United States Patent
Yan et al.

(10) Patent No.: US 12,025,447 B2
(45) Date of Patent: Jul. 2, 2024

(54) MAP MATCHING METHOD, APPARATUS AND ELECTRONIC DEVICE

(71) Applicants: Apollo Intelligent Connectivity (Beijing) Technology Co., Ltd., Beijing (CN); Apollo Smart Mobility Technology (Guangzhou) Co. Ltd., Guangzhou (CN)

(72) Inventors: Qingyue Yan, Beijing (CN); Yuzhan Cai, Beijing (CN)

(73) Assignees: Apollo Intelligent Connectivity (Beijing) Technology Co., Ltd., Beijing (CN); Apollo Smart Mobility Technology (Guangzhou) Co. Ltd., Guangzhou (CN)

( * ) Notice: Subject to any disclaimer, the term of this patent is extended or adjusted under 35 U.S.C. 154(b) by 50 days.

(21) Appl. No.: 17/819,394

(22) Filed: Aug. 12, 2022

(65) Prior Publication Data
US 2022/0390240 A1    Dec. 8, 2022

(30) Foreign Application Priority Data
Feb. 25, 2022  (CN) .......................... 202210181870.8

(51) Int. Cl.
  *G01C 21/32*   (2006.01)
  *G01C 21/00*   (2006.01)
  *G06N 3/04*    (2023.01)

(52) U.S. Cl.
  CPC .......... *G01C 21/32* (2013.01); *G01C 21/3815* (2020.08); *G01C 21/387* (2020.08); *G06N 3/04* (2013.01)

(58) Field of Classification Search
  CPC ...... G01C 21/32; G01C 21/38; G01C 21/387; G01C 21/3815; G06N 3/04
  See application file for complete search history.

(56) References Cited

U.S. PATENT DOCUMENTS 10,969,232 B1    4/2021   Johnson et al.
11,802,771 B2 *  10/2023  Malson .............. G01C 21/3446
                          (Continued)

FOREIGN PATENT DOCUMENTS

CN      1653505 A      8/2005
CN    111380540 A      7/2020
                 (Continued)

OTHER PUBLICATIONS

Search Report of corresponding European Application No. 22189783. 8, dated Jun. 2, 2023, 8 pages.
(Continued)

*Primary Examiner* — Aaron L Troost
(74) *Attorney, Agent, or Firm* — Tucker Ellis LLP

(57) ABSTRACT

A map matching method, an apparatus and an electronic device related to the technical field of artificial intelligence such as high-precision map, autonomous driving, internet of vehicles, and smart cockpit, where a specific implementation is: when matching a high-precision map with a standard-precision map, firstly acquire road network data corresponding to the high-precision map and the standard-precision map to be matched; and construct a first graph network based on the road network data corresponding to the high-precision map, and construct a second graph network based on the road network data corresponding to the standard-precision map, then determine a matching result between the high-precision map and the standard-precision map based on the first graph network and the second graph network. By the method using the graph network, the matching of the high-precision map with the standard-precision map can be accurately realized, thereby effectively improving accuracy of the matching result.

17 Claims, 4 Drawing Sheets

(56) References Cited

U.S. PATENT DOCUMENTS

| | | | |
|---|---|---|---|
| 2018/0158206 A1 | 6/2018 | Han | |
| 2019/0354689 A1 | 11/2019 | Li et al. | |
| 2020/0348145 A1* | 11/2020 | Paranjpe | G01C 21/367 |
| 2021/0042942 A1 | 2/2021 | Emrich et al. | |
| 2021/0223049 A1* | 7/2021 | Johnson | G01C 21/3407 |
| 2022/0120582 A1* | 4/2022 | Pei | G01C 21/3407 |

FOREIGN PATENT DOCUMENTS

| | | |
|---|---|---|
| CN | 110174110 B | 5/2021 |
| CN | 113280824 A | 8/2021 |
| CN | 113701776 A | 11/2021 |
| CN | 113971723 A | 1/2022 |
| WO | 2022/007818 A1 | 1/2022 |

OTHER PUBLICATIONS

"SuperGlue Features", https://zhuanlan.zhihu.com/p/436883365, accessed Feb. 10, 2022, 23 pages.

Office Action of corresponding Chinese Application No. 202210181870.8, dated Sep. 28, 2023, 11 pages.

The Second Office Action of corresponding Chinese Application No. 202210181870.8, dated Feb. 7, 2024, 13 pages.

\* cited by examiner

MAP MATCHING METHOD, APPARATUS AND ELECTRONIC DEVICE

CROSS-REFERENCE TO RELATED APPLICATION

This application claims priority to Chinese Patent Application No. 202210181870.8, filed on Feb. 25, 2022, which is hereby incorporated by reference in its entirety.

TECHNICAL FIELD

The present disclosure relates to the technical field of image processing and, in particular, to the technical field of artificial intelligence such as high-precision map, autonomous driving, internet of vehicles, and smart cockpit, and specifically, to a map matching method, apparatus, and electronic device.

BACKGROUND

In an autonomous driving scenario of the vehicle, the map used by the autonomous driving technology is a high-precision map, and the map used by the vehicle navigation system is a standard-precision map. Therefore, it is necessary to match the high-precision map and the standard-precision map to control the vehicle to drive autonomously according to the result.

At present, when the high-precision map and the standard map are to be matched, the link data of the high-precision map and the link data of the standard map describe different road shapes, resulting poor accuracy of the matching.

SUMMARY

According to a first aspect of the present disclosure, a map matching method is provided, and the map matching method may include:
  acquiring road network data respectively corresponding to a high-precision map and a standard-precision map to be matched;
  constructing a first graph network based on the road network data corresponding to the high-precision map, and constructing a second graph network based on the road network data corresponding to the standard-precision map; and
  determining a matching result between the high-precision map and the standard-precision map based on the first graph network and the second graph network.

According to a second aspect of the present disclosure, an electronic device is provided, and the electronic device may include:
  at least one processor; and
  a memory communicatively coupled with the at least one processor; where,
  the memory stores thereon instructions executable by the at least one processor to enable the at least one processor to execute the map matching method described in the above first aspect.

According to a third aspect of the present disclosure, non-transitory computer-readable storage medium having computer instructions stored thereon is provided, where the computer instructions are used to cause a computer to execute the map matching method described in the above first aspect.

It should be understood that the content described in this section is not intended to identify essential or significant features of embodiments of the present disclosure, and is not intended to limit the scope of the present disclosure. Other features of the present disclosure will become easy to understand by the following descriptions.

BRIEF DESCRIPTION OF DRAWINGS

The accompanying drawings are used for a better understanding of the solution, and do not constitute any limitation on the present disclosure. In the drawings.

DESCRIPTION OF EMBODIMENTS

Figure 1:
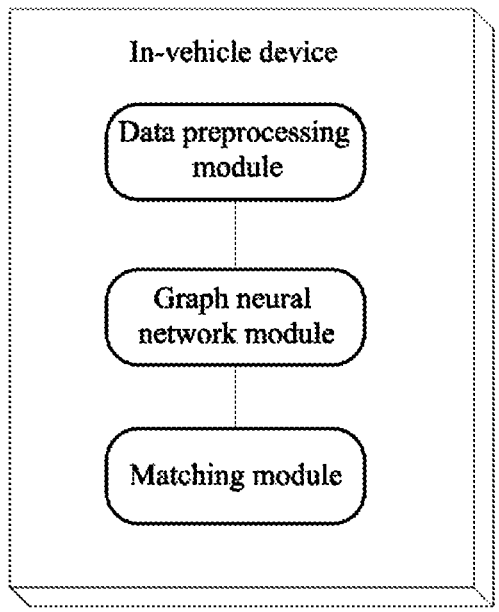
FIG. 1 is a schematic diagram of an application framework provided by an embodiment of the present disclosure.

The present disclosure provides a map matching method, an apparatus and an electronic device, which can accurately realize the matching of the high-precision map with the standard-precision map, and improve the accuracy of the matching result.

According to the technical solution of the present disclosure, the matching of the high-precision map with the standard-precision map can be accurately realized, and the accuracy of the matching result is improved.

Exemplary embodiments of the present disclosure are described below with reference to the accompanying drawings, and include various details of the embodiments of the present disclosure to facilitate understanding, which should be considered as merely exemplary. Therefore, those of ordinary skilled in the art should recognize that various changes and modifications may be made to the embodiments described herein without departing from the scope and spirit of the present application. Also, for clarity and conciseness, descriptions of well-known functions and structures are omitted in the following description.

In the embodiments of the present disclosure, "at least one" refers to one or more, and "a plurality of" refers to two or more. The phrase "and/or" describes the access relationship of the associated objects, indicating that there may be three kinds of relationships. For example, A and/or B may indicate that A exists alone, both A and B exist at the same time, and B exists alone, where A and B can be singular or plural. In the verbal description of the present disclosure, the character "/" generally indicates that the contextual object is in an "or" relationship. In addition, in the embodiments of the present disclosure, "first", "second", "third", "fourth", "fifth", and "sixth" are only for the purpose of distinguishing contents of different objects, and have no other special meaning.

A technical solution provided by the embodiments of the present disclosure can be applied to the technical field of artificial intelligence such as high-precision map, autonomous driving, internet of vehicles, and smart cockpit. In the autonomous driving scenario of the vehicle, the map used by the autonomous driving technology is a high-precision map, but the map used by the vehicle navigation system is a standard-precision map. Therefore, when the accuracy of the maps used by the autonomous driving technology and the maps used by the navigation system is different, how the autonomous driving of the vehicle should be controlled based on maps with different precision would be crucial for the safety of vehicle driving.

As used herein, the standard-precision map is a map with "meter-level" precision, and its precision is generally about 10 meters.

The high-precision map is a map with "centimeter-level" precision, and its precision needs to reach 20 centimeter. The high-precision map means high-precision, up-to-date, and high-richness electronic maps with absolute and relative precision within 1 meter. The high-precision map contains rich information, including road information such as road type, curvature, lane line position, and environmental object information such as roadside infrastructure, obstacle, and traffic sign, as well as real-time dynamic information such as traffic flow and traffic light status information.

In general, in order to control the autonomous driving of the vehicle based on maps with different precisions, it is necessary to pre-establish a static correlation table between link data of the maps with different precisions to match the link data of maps with different precisions; and then can the autonomous driving of the vehicle be controlled based on the matching result. However, the link data of the high-precision map is the link data describing a baseline that is an innermost lane edge along a direction of traffic, while the link data of the standard-precision map is the link data describing a road centerline, these facts would result in differences in the road shapes described by the link data of maps with different precisions. Therefore, using an existing map matching method would lead to a poor matching result.

In order to improve the accuracy of the matching result, in the present disclosure, it is proposed to construct a corresponding graph network based on the link data, and then implement the matching of maps with different precisions based on the graph network. For example, referring to FIG. 1, which is a schematic diagram of an application framework provided by an embodiment of the present disclosure, the electronic device used for implementing the technical solution may be an in-vehicle device or other electronic devices, which may be specifically configured based on actual requirements. Taking an in-vehicle device as an example, the in-vehicle device may include three modules, which are a data preprocessing module, a graph neural network module, and a matching module, respectively.

The data preprocessing module is mainly configured to acquire the link data corresponding, respectively, to the high-precision map and the standard-precision map to be matched.

The graph neural network module is mainly configured to construct the graph network corresponding to the high-precision map based on the link data corresponding to the high-precision map, and to construct the graph network corresponding to the standard-precision map based on the link data corresponding to the standard-precision map.

The matching module is mainly configured to determine the matching result between the high-precision map and the standard-precision map based on the graph network corresponding to the high-precision map and the graph network corresponding to the standard-precision map.

As described above, by constructing the graph networks for the high-precision map and the standard-precision map, respectively, and matching the high-precision map with the standard-precision map based on the corresponding graph networks of the high-precision map and the standard-precision map to determine the matching result between the high-precision map and the standard-precision map, that is, by the method of the graph network, the matching of the high-precision map and the standard-precision map can be accurately realized, thereby effectively improving the accuracy of the matching result.

In the following, the map matching method provided by the present disclosure will be described in detail by specific embodiments. It can be understood that the following specific embodiments may be combined with each other, and the same or similar concepts or processes may be omitted in some embodiments.

Embodiment 1

Figure 2:
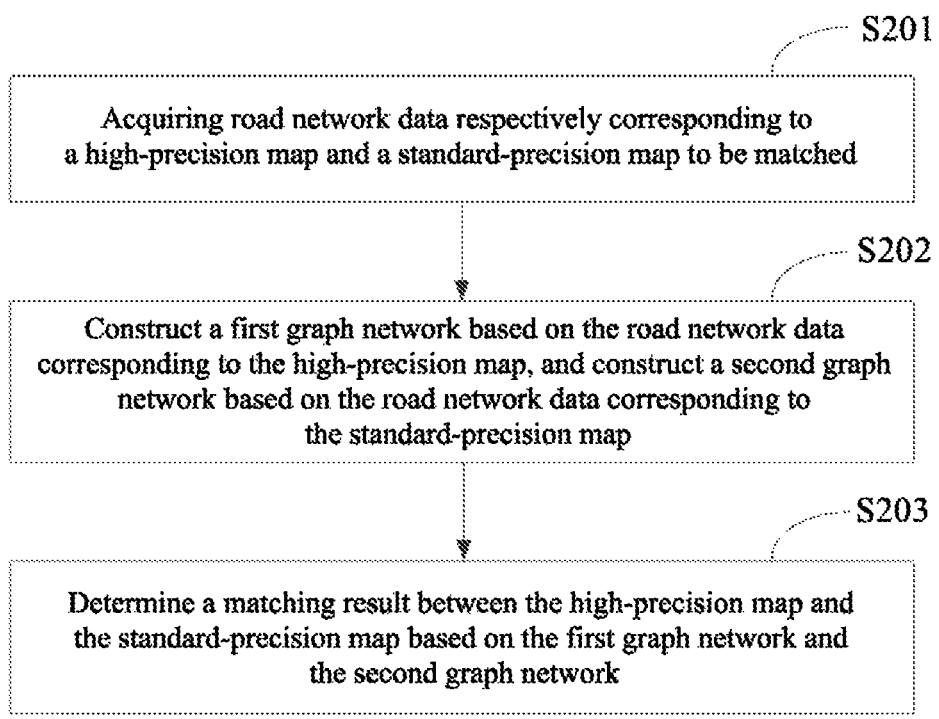
FIG. 2 is a schematic flowchart of a map matching method provided according to a first embodiment of the present disclosure.

FIG. 2 is a schematic flowchart of a map matching method provided according to a first embodiment of the present disclosure. The map matching method may be executed by software and/or hardware apparatus. For example, the hardware apparatus may be a terminal or a server. For example, please refer to FIG. 2, the map matching method may include:

S201. Acquiring road network data respectively corresponding to a high-precision map and a standard-precision map to be matched.

For example, the road network data can be link data. In general, in terms of the real world, the link data of the high-precision map is the link data describing the baseline that is the innermost lane edge along the direction of traffic, and the link data of the standard-precision map is the link data describing the road centerline.

For example, when acquiring the road network data respectively corresponding to the high-precision map and the standard-precision map to be matched, the road network data respectively corresponding to the high-precision map and the standard-precision map to be matched may be received from other devices. The road network data respectively corresponding to the high-precision map and the standard-precision map to be matched may be searched and acquired from a local storage. The road network data respectively corresponding to the high-precision map and the standard-precision map to be matched may be acquired by other ways, for example, from a third party, which may be specifically configured based on actual requirements. Here, the actual method for acquiring the road network data is not specifically limited in this embodiment of the present disclosure.

After respectively acquiring the road network data respectively corresponding to the high-precision map and the standard-precision map to be matched, the following S202 can be executed:

S202. Constructing a first graph network based on the road network data corresponding to the high-precision map, and constructing a second graph network based on the road network data corresponding to the standard-precision map.

The graph network includes a plurality of nodes, with connection relationships between the nodes.

After the first graph network corresponding to the high-precision map and the second graph network corresponding to the standard-precision map are respectively constructed, the matching result between the high-precision map and the standard-precision map may be determined based on the first graph network and the second graph network.

S203, determining a matching result between the high-precision map and the standard-precision map based on the first graph network and the second graph network.

It can be seen that in the embodiment of the present disclosure, when matching the high-precision map and the standard-precision map, the road network data respectively corresponding to the high-precision map and the standard-precision map to be matched are acquired first, the first graph network is constructed based on the road network data corresponding to the high-precision map, the second graph network is constructed based on the road network data corresponding to the standard-precision map, and the matching result between the high-precision map and the standard-precision map is determined based on the first graph network and the second graph network. In this way, by the method of the graph network, the matching of the high-precision map and the standard-precision map can be accurately realized, thereby effectively improving the accuracy of the matching result.

Based on the embodiment shown in the above-mentioned FIG. 2, in the above-mentioned S202, it is considered that the constructing method of the first graph network is constructed based on the road network data corresponding to the high-precision map and the second graph network is constructed based on the road network data corresponding to the standard-precision map is similar. For avoiding repetition, the constructing of the corresponding graph network based on the road network data corresponding to the high-precision map or the standard-precision map will be used as an example for illustration.

For example, when constructing the corresponding graph network based on the road network data corresponding to the map, at least the following two possible implementations may be included.

In a possible implementation, an initial graph network can be constructed based on the road network data corresponding to the map first. Then, a relevant node whose node degree is a preset value is eliminated from the initial graph network to obtain the graph network including only bifurcation points, so as to obtain the graph network corresponding to the map.

For example, the preset value can be set to 2. In an embodiment of the present disclosure, a node with a node degree of 2 can be eliminated from the initial graph network to obtain a graph network including only bifurcation points, that is, the first graph network corresponding to the high-precision map and the second graph corresponding to the standard-precision map have both become graph networks including only bifurcation points. Here, a non-bifurcation point is the node whose node degree is 2.

Figure 3:
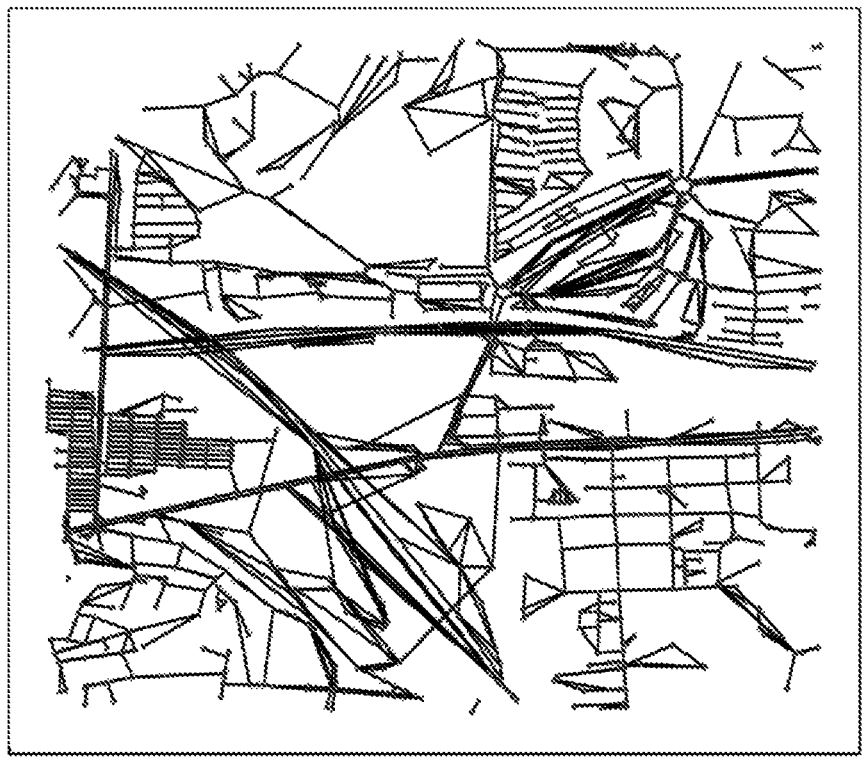
FIG. 3 is a schematic diagram of a constructed initial graph network provided by an embodiment of the present application.
Figure 4:
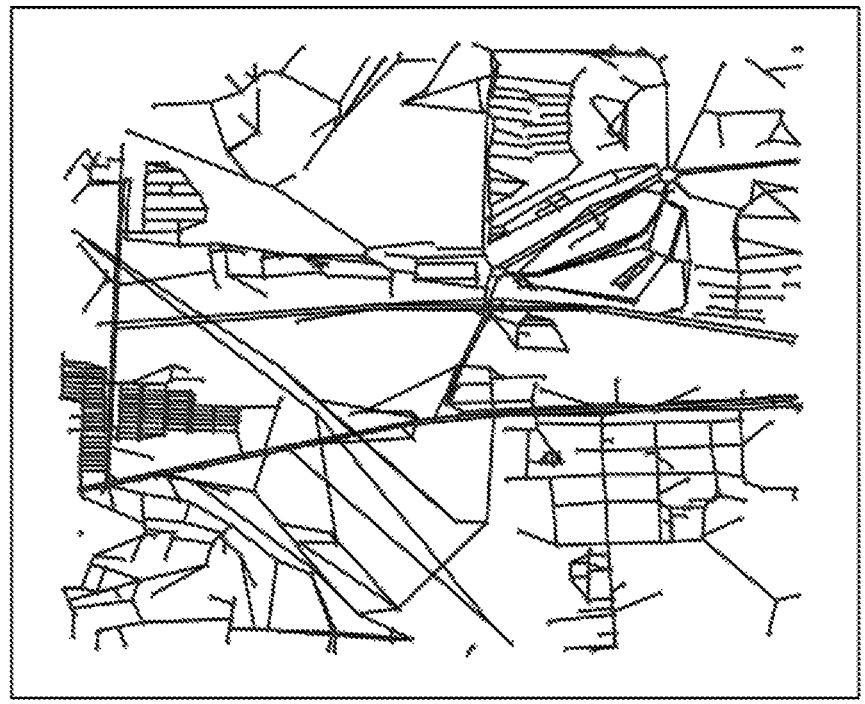
FIG. 4 is a schematic diagram of a constructed graph network provided by an embodiment of the present application.

For example, when constructing the initial graph network based on the road network data, i.e., the link data, corresponding to the map, a starting point of each link data corresponding to the map, an end point of the link data and the connection relationship between different link data can be added to the map. The node in the graph network is used to represent link data, and the node's identification can be represented by a link-id or a node-id, as long as the identification is guaranteed to be unique in the graph network. Hence, the road network data corresponding to the map can be acquired to construct the initial graph network. For example, referring to FIG. 3, which is a schematic diagram of a constructed initial graph network provided by an embodiment of the present application, it can be seen that the graph network includes a plurality of nodes used to represent link data, and the connection relationship between different nodes. In order to improve the accuracy of map matching, after obtaining the initial graph network, it is necessary to further eliminate the relevant node with the node degree of 2 from the initial graph network to obtain a graph network including only bifurcation points. For example, referring to FIG. 4, which is a schematic diagram of a constructed graph network provided by an embodiment of the present application, it can be seen that the graph network no longer includes relevant nodes with the node degree of 2, hence becoming a graph network including only bifurcation points.

In another possible implementation, non-bifurcation point data can be firstly eliminated from the road network data corresponding to the map to obtain updated road network data. Then, the graph network including only bifurcation points is constructed to obtain the graph network corresponding to the map.

It can be understood that when constructing the graph networks corresponding to the maps, the embodiments of the present disclosure only take the above two possible implementations as examples for illustration, rather than mean that the embodiments of the present disclosure are limited thereto.

In this way, by constructing the first graph network corresponding to the high-precision map and the second graph network corresponding to the standard-precision map, the high-precision map and the standard-precision map can be matched based on the first graph network corresponding to the high-precision map and the second graph network corresponding to the standard-precision map to determine the matching result between the high-precision map and the standard-precision map, hence arriving at the above S203. In order to facilitate the understanding of how to determine the matching result between the high-precision map and the standard-precision map based on the first graph network and the second graph network in the above S203, in the following, Embodiment 2 shown in FIG. 5 will be described in detail.

Embodiment 2

Figure 5:
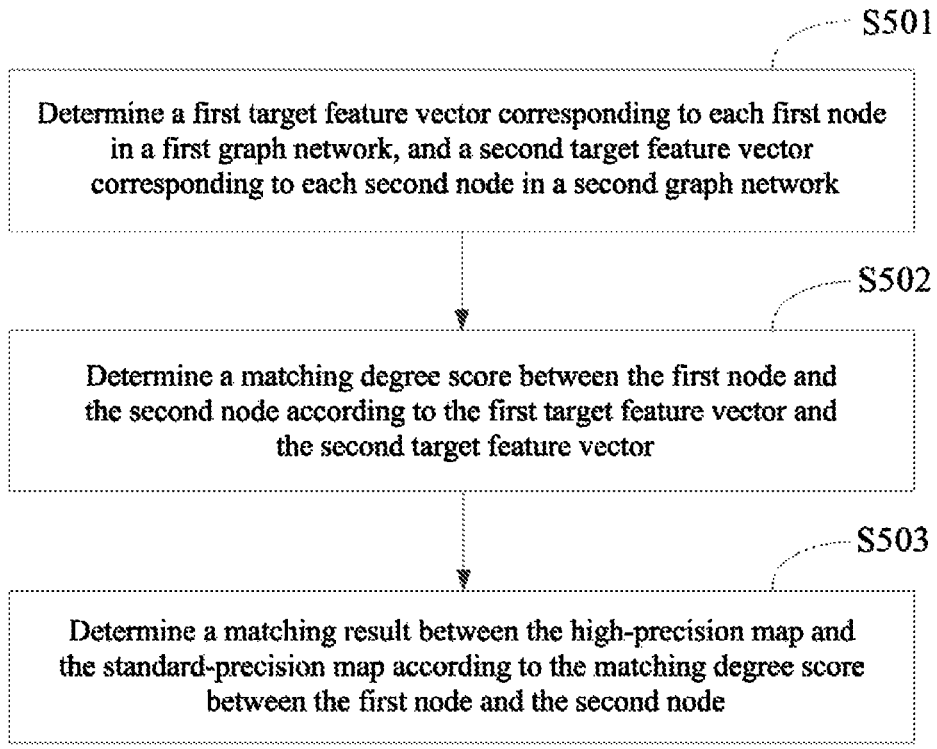
FIG. 5 is a schematic flowchart of a method for determining a matching result of a high-precision map with a standard-precision map provided according to a second embodiment of the present disclosure.

FIG. 5 is a schematic flowchart of a method for determining a matching result between the high-precision map and the standard-precision map provided according to a second embodiment of the present disclosure. The method can also be executed by software and/or hardware apparatus. For example, please refer to FIG. 5, the determining method may include:

S501. Determining a first target feature vector corresponding to each first node in the first graph network, and a second target feature vector corresponding to each second node in the second graph network.

For example, when determining the first target feature vector corresponding to the first node and the second target feature vector corresponding to the second node, a first initial feature vector corresponding to the first node and a second initial feature vector corresponding to the second node are processed by a multi-layer perceptron first to obtain a first feature vector corresponding to the first node and a second feature vector corresponding to the second node. Then, information propagation based on attention mechanism is performed on the first feature vector by the first feature vector and the second feature vector, so as to obtain a first target feature vector; and information propagation based on attention mechanism is performed on the first feature vector by the first feature vector and the second feature vector, so as to obtain a second target feature vector.

For example, when performing information propagation based on attention mechanism, a weight used for the information propagation is determined based on attention mechanism click model. Hence, a target feature vector of the node determined based on a neural network of multi-layer perceptron processing and attention mechanism is illustrated in the following Formula 1, Formula 2, Formula 3, Formula 4, and Formula 5.

$$Q_i = W_1^{j(l)} x_i^Q + b_1 \quad \text{Formula 1}$$

$$\begin{bmatrix} K_j \\ V_j \end{bmatrix} = \begin{bmatrix} W_2 \\ W_3 \end{bmatrix}^{(l)} x_j^S + \begin{bmatrix} b_2 \\ b_3 \end{bmatrix} \quad \text{Formula 2}$$

$$s_i = Q \cdot K^T \quad \text{Formula 3}$$

$$\alpha_{ij} = \text{softmax}\left(\frac{s_{ij}}{\sqrt{\dim}}\right) \quad \text{Formula 4}$$

$$m_{\varepsilon \to i} = \Sigma_{j:(i,j \in \varepsilon)} \alpha_{ij} V_j \quad \text{Formula 5}$$

where Q represents query, K represents key, V represents value, m represents propagated information, W and b both represent hyper-parameters, x represents the target feature vector of the node, and dim represents the dimension of the input parameter in the above formula. When performing information transfer, a score can be calculated first: $s_i = Q \cdot K^T$, where T means transposition, $\alpha_{ij}$ can be obtained by $$\alpha_{ij} = \text{softmax}\left(\frac{s_j}{\sqrt{\dim}}\right),$$

and the information transfer between nodes can be realized by the above formula 5.

After separately determining the first target feature vector corresponding to the first node in the first graph network and the second target feature vector corresponding to the second node in the second graph network, a matching degree score between the first node and the second node can be determined according to the first target feature vector and the second target feature vector, that is, the following S502 is executed:

S502. Determining a matching degree score between the first node and the second node according to the first target feature vector and the second target feature vector.

In general, the matching degree score is proportional to the matching degree, that is, the larger the matching degree score is, the higher the corresponding matching degree is; the smaller the matching degree score is, the lower the corresponding matching degree is.

It can be understood that, in the embodiments of the present disclosure, in order to improve the accuracy of the matching result, in general, it is necessary to calculate matching degree scores between any two nodes among a plurality of first nodes and a plurality of second nodes when determining the matching degree score between the first node and the second node because that could ensure the comprehensive coverage of the matching degree score.

S503: determining a matching result between the high-precision map and the standard-precision map according to the matching degree score between the first node and the second node.

For example, when determining the matching result between the high-precision map and the standard-precision map according to the matching degree score between the first node and the second node, a target score matrix corresponding to the matching degree scores can be determined according to the matching degree score between the first node and the second node; and then, a transformation processing can be performed on the target score matrix based on an optimal transfer algorithm to obtain a corresponding assignment matrix, where an element in the assignment matrix is used to represent a matching relationship between the first node and the second node; and then a matching result between the high-precision map and the standard-precision map is determined according to the assignment matrix.

The element in the target score matrix is recorded as the matching degree score between the first node and the second node, where different scores represent matching degrees between different nodes. The assignment matrix is a matrix including only 0s and 1s. The first node and the second node corresponding to the position of an element 1 have a matching relationship, and the first node and the second node corresponding to the position of an element 0 do not have a matching relationship. In this way, the matching result between the high-precision map and the standard-precision map is accurately determined according to the elements in the assignment matrix.

For example, when determining the target score matrix corresponding to the matching degree score according to the matching degree score between the first node and the second node, an initial score matrix corresponding to the matching degree score is determined according to the matching degree score between the first node and the second node; and a score sum of row element in the initial score matrix and a score sum of column elements in the initial score matrix are determined; and then the initial score matrix is updated based on the score sum of the row elements and the score sum of the column elements to obtain the target score matrix.

For example, when updating an initial score matrix based on the score sum of row elements and the score sum of column elements, a "trash can" mechanism can be introduced, in which a row element and/or a column element whose score sum is smaller than a preset score value is discarded into the "trash can". That is, row elements and/or the column elements whose score sums are smaller than the preset score value are eliminated from the initial score matrix to obtain an updated score matrix; and the updated score matrix will be determined to be the target score matrix.

Assuming that the first graph network corresponding to the high-precision map includes m first nodes, the second graph network corresponding to the standard-precision map includes n second nodes, the corresponding initial score matrix obtained is an m*n score matrix, and the score sum of each row element in the initial score matrix, and the score sum of each column element are calculated, where an element at the i-th row and j-th column in the initial score matrix is the matching degree score between the i-th first node and the j-th second node, where i is less than or equal to m, and j is less than or equal to n. Assuming that the score sum of the elements in the i-th row is smaller than the preset score value, the i-th row element is eliminated from the initial score matrix to obtain the target score matrix. Hence, in the target score matrix, the score sum of each row element and the score sum of each column element are both greater than or equal to the preset score value.

After obtaining the target score matrix, a transformation processing can be performed on the target score matrix based on an optimal transfer algorithm to obtain a corresponding assignment matrix. For example, the transformation processing can be performed on the target score matrix, where when performing the transformation processing, a truth table between the high-precision map and the standard-precision map obtained by pre-training can be used, and the transformation processing can be performed on the target score matrix based on the truth table to obtain the corresponding assignment matrix. Here, the truth table is obtained by training based on a supervised loss that minimizes a logarithmic loss function between truth and predicted values.

It can be seen that in the embodiment of the present disclosure, when determining the matching result between the high-precision map and the standard-precision map, the first target feature vector corresponding to the first node in the first graph network corresponding to the high-precision map and the second target feature vector corresponding to the second node in the second graph network corresponding to the standard-precision map can be determined first; and the matching degree score between the first node and the second node is determined according to the first target feature vector and the second target feature vector; and then the matching result between the high-precision map and the standard-precision map can be determined according to the matching degree score between the first node and the second node, so that the matching result between the high-precision map and the standard-precision map can be accurately determined, hence improving the accuracy of the matching result.

Embodiment 3

Figure 6:
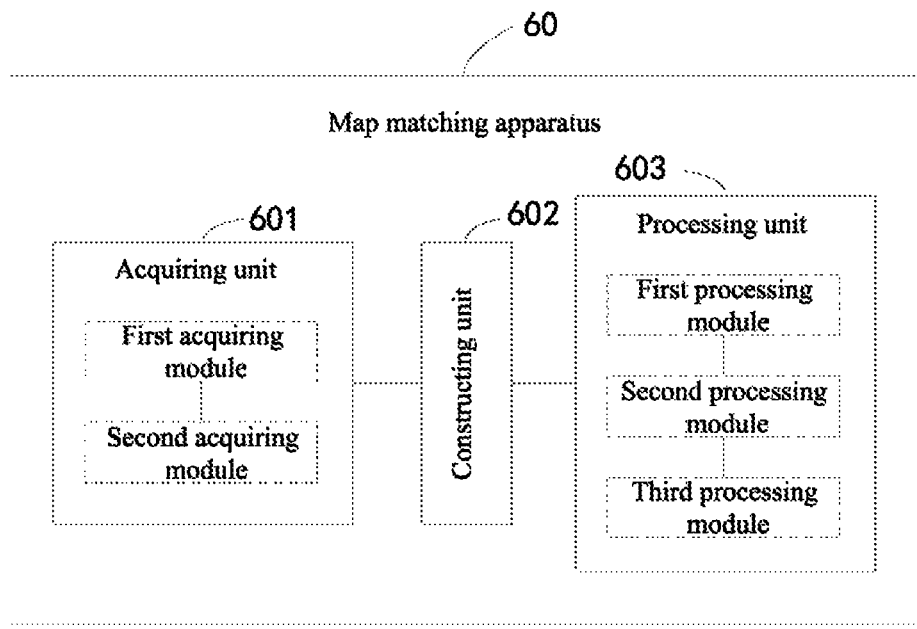
FIG. 6 is a schematic structural diagram of a map matching apparatus provided according to a third embodiment of the present disclosure.

FIG. 6 is a schematic structural diagram of a map matching apparatus 60 provided according to a third embodiment of the present disclosure. For example, please refer to FIG. 6, the map matching apparatus 60 may include:
- an acquiring unit 601, configured to acquire road network data respectively corresponding to a high-precision map and a standard-precision map to be matched;
- a constructing unit 602, configured to construct a first graph network based on the road network data corresponding to the high-precision map, and construct a second graph network based on the road network data corresponding to the standard-precision map;
- a processing unit 603, configured to determine a matching result between the high-precision map and the standard-precision map based on the first graph network and the second graph network.

In an embodiment, the processing unit 603 includes a first processing module, a second processing module, and a third processing module, where
- the first processing module is configured to determine a first target feature vector corresponding to each first node in the first graph network, and a second target feature vector corresponding to each second node in the second graph network;
- the second processing module is configured to determine a matching degree score between the first node and the second node according to the first target feature vector and the second target feature vector;
- the third processing module is configured to determine a matching result between the high-precision map and the standard-precision map according to the matching degree score between the first node and the second node.

In an embodiment, the first processing module includes a first processing sub-module and a second processing sub-module, where
- the first processing sub-module is configured to perform multi-layer perceptron processing on a first initial feature vector corresponding to the first node and a second initial feature vector corresponding to the second node to obtain a first feature vector corresponding to the first node and a second feature vector corresponding to the second node;
- the second processing sub-module is configured to perform information propagation based on attention mechanism on the first feature vector by the first feature vector and the second feature vector to obtain a first target feature vector; and perform information propagation based on the attention mechanism on the second feature vector by the first feature vector and the second feature vector to obtain a second target feature vector.

In an embodiment, the third processing module includes a third processing sub-module, a fourth processing sub-module and a fifth processing sub-module, where
- the third processing sub-module is configured to determine a target score matrix corresponding to the matching degree score according to the matching degree score between the first node and the second node;
- the fourth processing sub-module is configured to perform transformation processing on the target score matrix based on an optimal transfer algorithm to obtain a corresponding assignment matrix, where an element in the assignment matrix is configured to represent a matching relationship between the first node and the second node;
- the fifth processing sub-module is configured to determine the matching result between the high-precision map and the standard-precision map according to the assignment matrix.

In an embodiment, the third processing sub-module is specifically configured to: determine an initial score matrix corresponding to the matching degree score according to the matching degree score between the first node and the second node; determine a score sum of row elements and a score sum of column elements in the initial score matrix; and update the initial score matrix based on the score sum of the row elements and the score sum of the column elements to obtain the target score matrix.

In an embodiment, the third processing sub-module is specifically configured to eliminate from the initial score matrix row elements and/or column elements whose score sum is smaller than a preset score value to obtain an updated score matrix; and determine the updated score matrix to be the target score matrix.

In an embodiment, the acquiring unit 601 includes a first acquiring module and a second acquiring module, where
- the first acquiring module is configured to construct an initial graph network based on the road network data corresponding to a map;
- the second acquiring module is configured to eliminate a relevant node whose node degree is a preset value from the initial graph network to obtain the graph network.

The map matching apparatus 60 provided by the embodiment of the present disclosure may perform the technical solution of the map matching method shown in any of the above-mentioned embodiments, and its implementation principle and beneficial effect are similar to the implementation principle and beneficial effect of the map matching method. Refer to the implementation principle and beneficial effects of the map matching method. For brevity, details are not repeated herein.

According to an embodiment of the present disclosure, the present disclosure also provides an electronic device, a readable storage medium, and a computer program product.

According to an embodiment of the present disclosure, the present disclosure also provides a computer program product that includes a computer program, where the computer program is stored in a readable storage medium. At least one processor of an electronic device may read the computer program from the readable storage medium, and at least one processor executes the computer program to cause the electronic device to implement the solution provided in any of the above embodiments.

Figure 7:
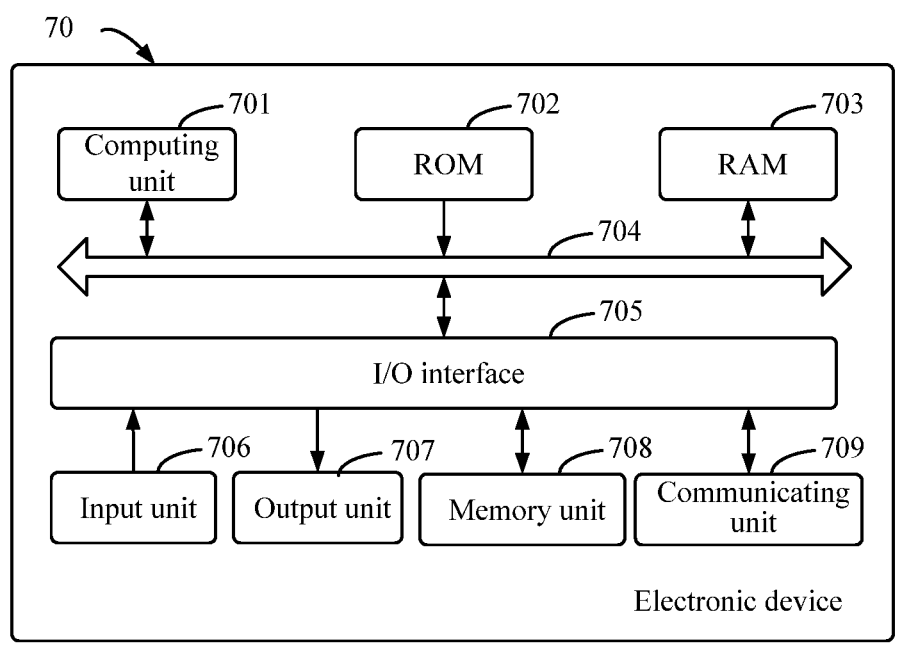
FIG. 7 is a schematic block diagram of an electronic device provided by an embodiment of the present disclosure.

FIG. 7 is a schematic block diagram of an electronic device 70 provided by an embodiment of the present disclosure. The electronic device is intended to represent various forms of digital computers, such as a laptop, a desktop, a workstation, a personal digital assistant, a server, a blade server, a mainframe computer, and any other computer where appropriate. The electronic device may also represent various forms of mobile devices, such as a personal digital assistant, a cellular phone, a smart phone, a wearable device, and any other similar computing device. The components shown herein, the connections and relationships therebetween, and the functions are intended as examples only, rather than as limitations on the implementation of the disclosure described and/or claimed herein.

As shown in FIG. 7, an electronic device 70 includes a computing unit 701 which may execute various suitable actions and procedures according to a computer program stored in a read-only memory (ROM) 702 or a computer program loaded from a memory unit 708 into a random access memory (RAM) 703. In the RAM 703, various programs and data required for operations of the device 70 may also be stored. The computing unit 701, the ROM 702, and the RAM 703 are connected to each other via a bus 704. An input/output (I/O) interface 705 is also connected to the bus 704.

Various components in the device 70 are connected to the I/O interface 705, including: an input unit 706, such as a keyboard, a mouse, etc.; an output unit 707, such as various types of displays, speakers, etc.; a memory unit 708, such as a magnetic disk, an optical disk, etc.; and a communicating unit 709, such as a network adapter, a modem, a wireless communication transceiver, etc. The communicating unit 709 allows the device 70 to exchange information/data with other devices via a computer network such as the Internet and/or various telecommunication networks.

The computing unit 701 may be various types of general-purpose and/or special-purpose processing components with processing and computing capabilities. Some examples of the computing unit 701 include, but are not limited to, a central processing unit (CPU), a graphics processing unit (GPU), various special-purpose artificial intelligence (AI) computing chips, various computing units that run machine learning model algorithms, digital signal processors (DSPs), and any suitable processor, controller, microcontroller, etc. The computing unit 701 executes the various methods and processes described above, such as the map matching method. For example, in some embodiments, the map matching method may be implemented as a computer software program that is tangibly contained in a machine-readable medium, such as the memory unit 708. In some embodiments, part or all of the computer program may be loaded and/or installed on the device 70 via the ROM 702 and/or the communicating unit 709. When the computer program is loaded into the RAM 703 and executed by the computing unit 701, one or more steps of the map matching method described above may be executed. Alternatively, in other embodiments, the computing unit 701 may be configured to execute the map matching method in any other suitable manners (for example, by means of firmware).

Various implementations of the systems and techniques described above herein may be implemented in a digital electronic circuit system, an integrated circuit system, a field programmable gate array (FPGA), an application specific integrated circuit (ASIC), an application specific standard product (ASSP), a system-on-chip (SOC), a complex programmable logic device (CPLD), computer hardware, firmware, software, and/or combinations thereof. These various embodiments may include: being implemented in one or more computer programs that may be executed and/or interpreted on a programmable system including at least one programmable processor. The programmable processor may be a special-purpose or general-purpose programmable processor that may receive data and instructions from a storage system, at least one input apparatus, and at least one output apparatus, and transmit data and instructions to the storage system, the at least one input apparatus, and the at least one output apparatus.

The program codes used to implement the method of the present disclosure may be written in any combination of one or more programming languages. These program codes may be provided to a processor or a controller of a general-purpose computer, a special-purpose computer, or other programmable data processing apparatus, so that when the program codes are executed by the processor or controller, the functions/operations illustrated in the flowcharts and/or block diagrams herein are implemented. The program codes may be executed entirely on a machine, partly executed on the machine, partly executed on the machine and partly executed on a remote machine as an independent software package, or entirely executed on the remote machine or server.

In the context of the present disclosure, a machine-readable medium may be a tangible medium that may contain or store a program for use by an instruction execution system, apparatus, or device or in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any appropriate combination thereof. More specific examples of the machine-readable storage medium will include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any appropriate combination thereof.

In order to provide interaction with a user, the systems and techniques described herein may be implemented on a computer with: a display apparatus (e.g., a cathode ray tube (CRT) or liquid crystal display (LCD) monitor) for displaying information to the user; and a keyboard and pointing apparatus (e.g., a mouse or a trackball), with which the user may provide inputs to the computer. Other kinds of apparatuses may also be used to provide interaction with users. For example, feedback provided to the user may be in any form of sensory feedback (e.g., visual feedback, auditory feedback, or tactile feedback); and the inputs from the user may be received in any form (including sound inputs, voice inputs, or tactile inputs).

The systems and techniques described herein may be implemented in a computing system that includes back-end components (e.g., as a data server), a computing system that includes middleware components (e.g., an application server), a computing system that includes front-end components (e.g., a terminal computer with a graphical user interface or a web browser, through which the user may interact with the implementation of the systems and techniques described herein), or a computing system that includes any combination of such back-end components, middleware components or front-end components. The components of the system may be interconnected via digital data communication (e.g., a communication network) in any form or medium. Examples of the communication network include: a local area network (LAN), a wide area network (WAN) and the Internet.

The computer system may include a client and a server. The client and the server are generally far from each other and usually interact through a communication network. The client-server relationship is generated by computer programs that run on corresponding computers and have a client-server relationship. The server may be a cloud server, also known as a cloud computing server or a cloud host, which is a host product in a cloud computing service system to solve shortcomings of difficult management and weak business scalability existed in traditional physical hosts and VPS services ("Virtual Private Server", or "VPS" for short). The server may also be a server of a distributed system, or a server combined with a blockchain.

It should be understood that for the various forms of processes shown above, steps may be reordered, added or deleted. For example, the steps described in the present disclosure may be executed in parallel, sequentially, or in different orders, as long as the desired results of the technical solutions disclosed in the present disclosure may be achieved, which is not limited herein.

The above specific implementations do not constitute a limitation on the scope of protection of the present disclosure. Those skilled in the art should understand that various modifications, combinations, sub-combinations and substitutions may be made according to design requirements and other factors. Any modification, equivalent replacement and improvement made within the spirit and principle of the present disclosure shall fall within the scope of protection of the present disclosure.

What is claimed is:

1. A map matching method, comprising:
    acquiring road network data respectively corresponding to a high-precision map and a standard-precision map to be matched;
    constructing a first graph network based on the road network data corresponding to the high-precision map, and constructing a second graph network based on the road network data corresponding to the standard-precision map;
    determining a matching result between the high-precision map and the standard-precision map based on the first graph network and the second graph network; and
    controlling autonomous driving of a vehicle based on the matching result;
    wherein the determining a matching result between the high-precision map and the standard-precision map based on the first graph network and the second graph network comprises:
    determining a first target feature vector corresponding to each first node in the first graph network, and a second target feature vector corresponding to each second node in the second graph network;
    determining a matching degree score between the first node and the second node according to the first target feature vector and the second target feature vector; and
    determining the matching result between the high-precision map and the standard-precision map according to the matching degree score between the first node and the second node.

2. The method according to claim 1, wherein the determining a first target feature vector corresponding to each first node in the first graph network, and a second target feature vector corresponding to each second node in the second graph network comprises:
    performing multi-layer perceptron processing on a first initial feature vector corresponding to the first node and a second initial feature vector corresponding to the second node to obtain a first feature vector corresponding to the first node and a second feature vector corresponding to the second node, respectively; and
    performing information propagation based on attention mechanism on the first feature vector by the first feature vector and the second feature vector to obtain the first target feature vector; and performing information propagation based on attention mechanism on the second feature vector by the first feature vector and the second feature vector to obtain the second target feature vector.

3. The method according to claim 2, wherein the determining the matching result between the high-precision map and the standard-precision map according to the matching degree score of the first node and the second node comprises:
    determining a target score matrix corresponding to the matching degree score according to the matching degree score between the first node and the second node;
    performing transformation processing on the target score matrix based on an optimal transfer algorithm to obtain a corresponding assignment matrix, wherein an element in the assignment matrix is configured to represent a matching relationship between the first node and the second node; and
    determining the matching result between the high-precision map and the standard-precision map according to the assignment matrix.

4. The method according to claim 2, wherein the determining a target score matrix corresponding to the matching degree score according to the matching degree score between the first node and the second node comprises:
    determining an initial score matrix corresponding to the matching degree score according to the matching degree score between the first node and the second node;
    determining a score sum of row elements in the initial score matrix, and a score sum of column elements in the initial score matrix; and
    updating the initial score matrix based on the score sum of the row elements and the score sum of the column elements to obtain the target score matrix.

5. The method according to claim 1, wherein the determining the matching result between the high-precision map and the standard-precision map according to the matching degree score of the first node and the second node comprises:

determining a target score matrix corresponding to the matching degree score according to the matching degree score between the first node and the second node;

performing transformation processing on the target score matrix based on an optimal transfer algorithm to obtain a corresponding assignment matrix, wherein an element in the assignment matrix is configured to represent a matching relationship between the first node and the second node; and determining the matching result between the high-precision map and the standard-precision map according to the assignment matrix.

6. The method according to claim 5, wherein the determining a target score matrix corresponding to the matching degree score according to the matching degree score between the first node and the second node comprises:

determining an initial score matrix corresponding to the matching degree score according to the matching degree score between the first node and the second node;

determining a score sum of row elements in the initial score matrix, and a score sum of column elements in the initial score matrix; and updating the initial score matrix based on the score sum of the row elements and the score sum of the column elements to obtain the target score matrix.

7. The method according to claim 6, wherein the updating the initial score matrix based on the score sum of the row elements and the score sum of the column elements to obtain the target score matrix comprises:

eliminating from the initial score matrix row elements and/or column elements whose score sum is smaller than a preset score value to obtain an updated score matrix; and determining the updated score matrix to be the target score matrix.

8. The method according to claim 1, wherein the constructing a first graph network based on the road network data corresponding to the high-precision map, and constructing a second graph network based on the road network data corresponding to the standard-precision map comprises:

constructing an initial graph network based on the road network data corresponding to the high-precision map and the standard-precision map, respectively; and eliminating from the initial graph network a relevant node whose node degree is a preset value to obtain the first and the second graph network, respectively.

9. A map matching apparatus, comprising:
at least one processor; and
a memory communicatively coupled with the at least one processor, wherein,
the memory stores thereon instructions executable by the at least one processor to enable the at least one processor to:

acquire road network data respectively corresponding to a high-precision map and a standard-precision map to be matched;

construct a first graph network based on the road network data corresponding to the high-precision map, and construct a second graph network based on the road network data corresponding to the standard-precision map;

determine a matching result between the high-precision map and the standard-precision map based on the first graph network and the second graph network; and control autonomous driving of a vehicle based on the matching result;

the at least one processor is further enabled to:

determine a first target feature vector corresponding to each first node in the first graph network, and a second target feature vector corresponding to each second node in the second graph network;

determine a matching degree score between the first node and the second node according to the first target feature vector and the second target feature vector; and determine the matching result between the high-precision map and the standard-precision map according to the matching degree score between the first node and the second node.

10. The apparatus according to claim 9, wherein the at least one processor is further enabled to:

perform multi-layer perceptron processing on a first initial feature vector corresponding to the first node and a second initial feature vector corresponding to the second node to obtain a first feature vector corresponding to the first node and a second feature vector corresponding to the second node, respectively; and perform information propagation based on attention mechanism on the first feature vector by the first feature vector and the second feature vector to obtain the first target feature vector; and perform information propagation based on attention mechanism on the second feature vector by the first feature vector and the second feature vector to obtain the second target feature vector.

11. The apparatus according to claim 10, wherein the at least one processor is further enabled to:

determine a target score matrix corresponding to the matching degree score according to the matching degree score between the first node and the second node;

perform transformation processing on the target score matrix based on an optimal transfer algorithm to obtain a corresponding assignment matrix; wherein, an element in the assignment matrix are configured to represent a matching relationship between the first node and the second node; and determine the matching result between the high-precision map and the standard-precision map according to the assignment matrix.

12. The apparatus according to claim 11, wherein,
at least one processor is further enabled to: determine an initial score matrix corresponding to the matching degree score according to the matching degree score between the first node and the second node; determine a score sum of row elements in the initial score matrix, and a score sum of column elements in the initial score matrix; and update the initial score matrix based on the score sum of the row elements and the score sum of the column elements to obtain the target score matrix.

13. The apparatus according to claim 9, wherein the at least one processor is further enabled to:

determine a target score matrix corresponding to the matching degree score according to the matching degree score between the first node and the second node;

perform transformation processing on the target score matrix based on an optimal transfer algorithm to obtain a corresponding assignment matrix; wherein, an element in the assignment matrix are configured to represent a matching relationship between the first node and the second node; and determine the matching result between the high-precision map and the standard-precision map according to the assignment matrix.

14. The apparatus according to claim 13, wherein,
at least one processor is further enabled to: determine an initial score matrix corresponding to the matching degree score according to the matching degree score between the first node and the second node; determine a score sum of row elements in the initial score matrix, and a score sum of column elements in the initial score matrix; and update the initial score matrix based on the score sum of the row elements and the score sum of the column elements to obtain the target score matrix.

15. The apparatus according to claim 14, wherein,
the at least one processor is further enabled to: eliminate from the initial score matrix row elements and/or column elements whose score sum is smaller than a preset score value to obtain
an updated score matrix; and determine the updated score matrix to be the target score matrix.

16. The apparatus according to claim 9, wherein the at least one processor is further enabled to:
construct an initial graph network based on the road network data corresponding to the high-precision map and the standard-precision map, respectively; and
eliminate from the initial graph network a relevant node whose node degree is a preset value to obtain the first and the second graph network, respectively.

17. A non-transitory computer-readable storage medium having computer instructions stored thereon, wherein the computer instructions are used to cause a computer to:
acquire road network data respectively corresponding to a high-precision map and a standard-precision map to be matched;
construct a first graph network based on the road network data corresponding to the high-precision map, and construct a second graph network based on the road network data corresponding to the standard-precision map;
determine a matching result between the high-precision map and the standard-precision map based on the first graph network and the second graph network; and
control autonomous driving of a vehicle based on the matching result;
wherein the computer is further caused to:
determine a first target feature vector corresponding to each first node in the first graph network, and a second target feature vector corresponding to each second node in the second graph network;
determine a matching degree score between the first node and the second node according to the first target feature vector and the second target feature vector; and
determine the matching result between the high-precision map and the standard-precision map according to the matching degree score between the first node and the second node.

* * * * *